US012767597B2

(12) United States Patent
Ottl

(10) Patent No.: US 12,767,597 B2
(45) Date of Patent: Oct. 20, 2026

(54) METHOD AND DEVICE FOR PRODUCING A CONSTRUCTION AGGREGATE

(71) Applicant: KRO Kiesgruben Rekultivierung Oberbayern GmbH, Fürstenfeldbruck (DE)

(72) Inventor: Thomas Ottl, Fürstenfeldbruck (DE)

(73) Assignee: T & T Bros. GmbH, Alling (DE)

( * ) Notice: Subject to any disclaimer, the term of this patent is extended or adjusted under 35 U.S.C. 154(b) by 0 days.

(21) Appl. No.: 19/072,685

(22) Filed: Mar. 6, 2025

(65) Prior Publication Data

US 2025/0197284 A1 Jun. 19, 2025

Related U.S. Application Data

(63) Continuation of application No. PCT/EP2024/070365, filed on Jul. 18, 2024.

(30) Foreign Application Priority Data

Jul. 20, 2023 (EP) .................................... 23186648

(51) Int. Cl.

*B28C 9/00* (2006.01)
*C04B 14/04* (2006.01)
*C04B 18/02* (2006.01)
*C04B 18/167* (2023.01)

(52) U.S. Cl.

CPC .............. *C04B 18/02* (2013.01); *B28C 9/002* (2013.01); *C04B 14/04* (2013.01); *C04B 18/167* (2013.01)

(58) Field of Classification Search

CPC ....... C04B 18/02; C04B 14/04; C04B 18/167; C04B 18/00; C04B 14/02; C04B 14/048; C04B 14/06; C04B 14/068; C04B 18/16; C04B 20/02; C04B 20/026; C04B 20/0076; B28C 9/002; B28C 9/00; B28C 7/00; B28C 7/0007; B28C 7/02; B28C 7/04; B28C 7/0404; B28C 7/0413

See application file for complete search history.

(56) References Cited

FOREIGN PATENT DOCUMENTS

| | | | | |
|---|---|---|---|---|
| CN | 106 623 353 A | | 5/2017 | |
| CN | 213468864 U | * | 6/2021 | |
| CN | 115 318 417 A | | 11/2022 | |
| JP | 2020007178 A | * | 1/2020 | |
| KR | 101429463 B1 | * | 8/2014 | ............ C04B 28/04 |

OTHER PUBLICATIONS

CN-213468864-U, machine translation (Year: 2021).*

Ghanbari, M., Abbasi, A.M. & Ravanshadnia, M. Production of natural and recycled aggregates: the environmental impacts of energy consumption and CO2 emissions. J Mater Cycles Waste Manag 20, 810-822 (2018). DOI:10.1007/s10163-017-0640-2 (Year: 2017).*

Thomas et al. "Strength and durability of concrete containing recycled concrete aggregates", Journal of Building Engineering, 19 (2018) 349-365. DOI: 10.1016/j.jobe.2018.05.007. (Year: 2018).*

KR-101429463-B1, machine translation (Year: 2014).*

JP-2020007178-A, machine translation (Year: 2020).*

McLanahan-1 Stradacon Penna Recycle C&D waste for reuse [retrieved from the internet at Oct. 28, 2025 from <URL: https://www.mclanahan.com/resource-library/mclanahan-modular-wash-plant-and-scrubbing-system-helps-stradacon-penna-recycle-c-d-waste-for-reuse>] (Year: 2023).*

McLanahan-1 Stradacon Penna Recycle C&D waste for reuse, wayback <URL:https://web.archive.org/web/20230530212805/https://www.mclanahan.com/resource-library/mclanahan-modular-wash-plant-and-scrubbing-system-helps-stradacon-penna-recycle-c-d-waste-for-reuse> (Year: 2023).*

McLanahan-2 C&D Recycling [retrieved from the internet at Oct. 28, 2025] (Year: 2023).*

McLanahan-3 Ultrawash Modular Wash Plants [retrieved from internet at Oct. 28, 2025 from <URL: https://www.mclanahan.com/products/ultrawash-modular-wash-plants>] (Year: 2022).*

McLanahan-3 Ultrawash Modular Wash Plants, wayback <URL:https://web.archive.org/web/20220813151315/https://www.mclanahan.com/products/ultrawash-modular-wash-plants> (Year: 2022).*

International Search Report dated Oct. 10, 2024 issued in PCT/EP2024/070365.

Written Opinion dated Oct. 10, 2024 issued in PCT/EP2024/070365.

* cited by examiner

*Primary Examiner* — Marites A Guino-O Uzzle
(74) *Attorney, Agent, or Firm* — Blank Rome LLP

(57) ABSTRACT

A method and device for producing a construction aggregate from a combination of natural raw and recycled materials is described. The method involves mixing these materials and washing them in a washer to remove elutriable components, thereby enhancing the quality of the aggregate. The process is designed to be cost-effective, energy-efficient, and environmentally friendly, minimizing the need for virgin materials and reducing landfill waste.

11 Claims, 1 Drawing Sheet

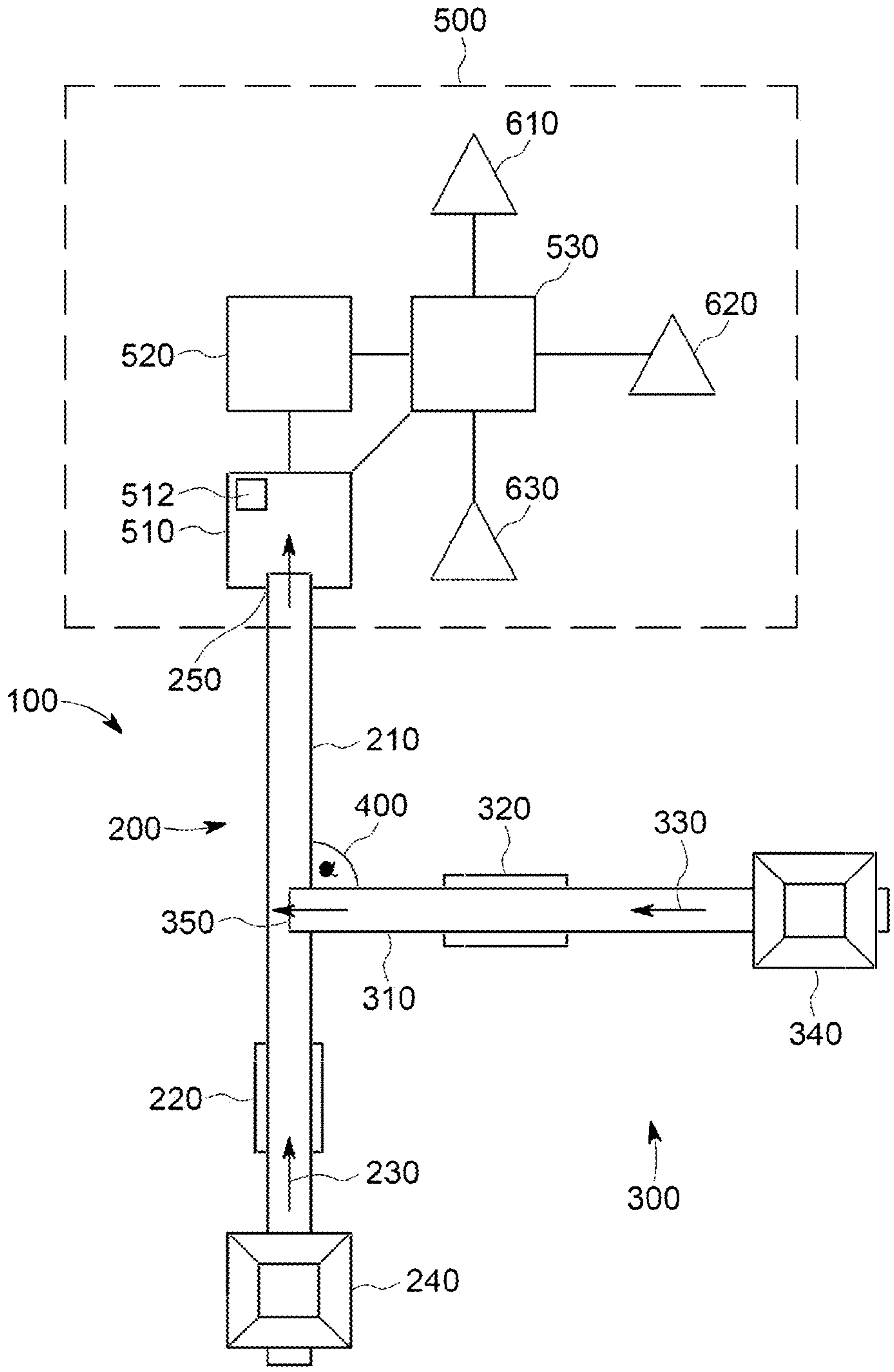
500
610
530
620
520
512
510
630
250
100
210
200
400
320
330
350
310
340
220
230
300
240

METHOD AND DEVICE FOR PRODUCING A CONSTRUCTION AGGREGATE

CROSS REFERENCE TO RELATED APPLICATIONS

This application is a continuation of International Patent App. No. PCT/EP2024/070365, filed Jul. 18, 2024, which claims the benefit of European Patent application Ser. No. 23/186,648.4, filed Jul. 20, 2023, the disclosures of which are hereby incorporated by reference herein.

FIELD OF THE INVENTION

The invention relates to a method and a device for producing a construction aggregate from virgin material and recycled material.

DESCRIPTION OF THE RELATED ART

The use of recycled materials in construction is gaining popularity as a sustainable and cost-effective alternative to traditional construction aggregate. The use of concrete with recycled material, includes environmental benefits, cost savings, durability, and reduced demand for virgin materials. In the context of resource extraction and environmental sustainability, the use of virgin materials is often scrutinized due to the environmental impact of their extraction and processing. Consequently, there is a growing emphasis on recycling and reusing materials to minimize the need for virgin material extraction. The separation of the recycled materials and the subsequent supply of virgin material also leads to resource depletion, habitat disruption, and higher energy consumption. The use of concrete, produced from a mix of recycled and virgin material, has been shown to be a viable option for a wide range of construction applications, including roadways, bridges, and buildings. Concrete with recycled materials reduces the amount of waste sent to landfills, which in turn reduces greenhouse gas emissions and conserves natural resources such as gravel, water, and energy. The use of concrete with recycled materials as construction aggregate may be more cost-effective than using new materials, as it may reduce the need for new materials and transportation costs. Concrete with recycled materials may be just as durable and strong as new concrete, which makes it a suitable replacement material for a variety of construction applications. The use of recycled concrete reduces the demand for virgin materials, which may help conserve natural resources and reduce environmental impacts associated with mining and processing of these materials. Overall, the use of recycled materials is a sustainable and cost-effective option for construction projects, with numerous benefits for the environment and the economy.

When recycled materials are used in construction aggregates, only coarse aggregates >4 mm or >2 mm are used. Therefore, the aggregates <2 mm or <4 mm are separated and removed from the recycled materials in a separate processing step. The separated fraction is subsequently transported away and landfilled. For the production of the recycled concrete and/or concrete, virgin material with a grain size <4 mm has to be added to the concrete aggregate. Therefore, the processes known in the art are not cost-effective, efficient, energy efficient, environmentally friendly, sustainable or provide a good quality.

SUMMARY OF THE INVENTION

The problem to be solved by the invention is to provide a method and a device for producing a more cost-effective, efficient, energy efficient, environmentally friendly and sustainable construction aggregate with a high quality for the use in concrete.

Solutions of the problem are described in the independent claims. The dependent claims relate to further improvements of the invention.

The invention is based on the observation that separating and removing the aggregates <2 mm and/or <4 mm from recycled material is unfavorable, because the fraction removed in the process has to transported, landfilled and has to be replaced by expensive virgin sand in the production of concrete aggregate.

A first embodiment relates to a method of producing a construction aggregate. A construction aggregate may include at least one material such as sand, gravel, crushed stone and recycled concrete. A construction aggregate may be an aggregate of minerals or mineraloid matter.

According to the method a first material and a second material are mixed. The first material may be washed together with the second material in at least one washer. Washing the first material together with the second material in at least one washer has the effect that the elutriable components of the first material and the second material are removed together in the same process step. The elutriable components can have a damaging effect on the concrete if they are present in large quantities. The removal of the elutriable components is therefore important for the quality and usability of the construction aggregate. Washing the first material together with the second material in at least one washer also has the advantage that the elutriable components of the first material and the second material can be removed together, resulting in a homogeneous material with homogeneous material properties. These properties are also important for the quality of the construction aggregate. Washing the first material together with the second material in at least one washer may also enhance the quality and usability of the material and may ensure that the material meets the desired quality standards for further processing or final use. Furthermore, no material, except for the elutriable components has to be removed, transported and/or landfilled and no additional virgin material has to be additionally supplied. This minimizes the use of virgin material and the need to landfill and/or the transport of material and hence minimizes resource depletion, habitat disruption, and energy consumption. Consequently, this process is cost-effective, efficient, energy efficient, environmentally friendly and sustainable, without sacrificing the quality of the product. Efficiency and energy efficiency is a factor, which plays a huge role in environmental friendliness and sustainability. Hence, improving the efficiency and/or energy efficiency always implies also improving the in environmental friendliness and sustainability.

A washer may be a means for cleaning and/or washing materials with a liquid medium, e.g., water. A washer in this document may be a piece of equipment used to clean and remove impurities or elutriable components, such as clay, loam, and/or contaminating admixtures, such as wood and metal or other unwanted materials. This is achieved by removing said impurities or elutriable components, through processes involving water and preferably mechanical action. A washer in this document may be a washing system, a washing installation or a washing plant and suitable for washing the materials described herein. Washing may be a process of treatment, e.g. cleaning by a solvent or liquid, e.g. water. The washer may be a gravel washer and/or sand washer and/or log washer. The washer may comprise a feeder, at least one screen, a water feeder. The term washer must not be confused with a flat washer, lining disk or shim.

The first material and the second material may be fed to a processing plant. The first material and the second material may be mixed before or after being fed to the processing plant. The first material and the second material may be mixed by a wheel loader. The first material and the second material may be mixed in a pile mixture. The wheel loader may deposit the first material and the second material in a predefined ratio in a pile. The wheel loader may mix the deposited material.

The first material and the second material may be mixed by feeding the first material and the second material to the processing plant. The first material and the second material may be mixed by at least one sizer and/or by at least one washer. The first material and the second material may be mixed by a compulsory mixer.

The construction aggregate may be bulk material. The processing plant may be a gravel and/or sand and/or crushed stone processing plant and/or a plant used in quarrying operations. The first material and the second material may be fed to the processing plant as a mutual mass flow and/or as a mixed material. The first material and the second material may be fed to the processing plant by a conveyor. The first material and the second material may be fed into a processing plant feed of the processing plant. The processing plant feed may be a feed hopper, a chute or the processing plant itself. The processing plant may include a washer.

The first material may be a virgin material. The term virgin material refers to raw materials and/or natural raw materials that have not been previously used or processed. These materials may be extracted directly from natural resources or their natural state. The material may be extracted or sourced directly from the natural deposits, such as quarries or riverbeds, in its natural form and has not undergone any recycling, repurposing, or reprocessing. The term virgin material in this document must not be confused with a virgin plastic or virgin polymer or any virgin material used in the field of polymers. The virgin material may be of sedimentary and/or igneous and/or metamorphic and/or clastic and/or hydrothermal origin. The virgin material may have one or several origin(s) and may include sedimentary rock and/or sedimentary material and/or igneous rock and/or metamorphic rock and/or clastic rocks and/or hydrothermal rocks. The virgin material may also only have a single origin. A virgin material may be natural raw material or natural building material. The terms natural material and natural building material may be used interchangeably. The virgin material may include rock and/or stone, and/or gravel and/or sand, and/or fragments of rock and/or stone, wherein rock and/or stone and/or gravel and/or sand may be any naturally occurring solid mass or aggregate of minerals or mineraloid matter. The virgin material may also include other naturally occurring materials, such as soil or organic materials. The virgin material may be rock and/or stone, and/or fragments of rock and/or stone, wherein rock and/or stone. The virgin material may include cobble, crushed stone, gravel, sand, silt and/or clay. The virgin material may include grain sizes in the range of 0-200 mm. In an embodiment, the virgin material may include grain sizes of 0-63 mm. As known in the art the grain size range may be described as d-D or alternatively as d/D. In general, sizing ranges are specified as d/D, where the d shows the smallest and D shows the largest square mesh grating that the particles may pass. The grain size range 0-63 mm can, as an example, also be described as 0/63. In an embodiment, the virgin material may include grain sizes of 0/22, 0/45 or 0/63.

The second material may be a recycled material. Recycled material may be material that has already been put to use, e.g. as building material. The recycled material may include artificial stone, and/or fragments of artificial stone and/or concrete. The recycled material may be limited to artificial stone, and/or fragments of artificial stone and/or concrete. The recycled material may also include residual building material such as steel, metal, metal compounds, metallic compounds. There may be small amounts of less than 1% of plastic and other materials. The recycled material may be artificial stone. Artificial stone may be made of a conglomerate of aggregate and cement stone as a binder. Artificial stone may be an anthropogenic conglomerate and/or breccia. Artificial stone may be concrete and/or crushed concrete. Artificial stone may be a mixture of at least two of the materials mentioned above. Artificial stone may be a conglomerate of aggregate and/or a conglomerate of aggregate and cement stone e.g. as a binder and/or an anthropogenic conglomerate and/or breccia and/or concrete and/or crushed concrete. Artificial stone may also be referred to as artificial rock. The recycled material may be a recycled aggregate and/or recycled artificial stone, i.e., construction waste or demolition rubble such as concrete and/or crushed concrete. The second material may not comprise or include household and/or domestic waste. The second material may not comprise household and/or domestic waste incineration slag. The recycled material does not comprise or include household garbage or household garbage incineration slag. As known in the art, domestic waste may be any waste that is produced in the home environment.

The second material may also be and/or comprise masonry, crushed masonry, such as brick, tile or artificial stone or a mixture thereof. The second material may include grain sizes less than at least one of 4 mm, 2 mm or 1 mm. The grain sizes may be in the range of 0-200 mm. In an embodiment, the recycled material may include grain sizes of 0/22, 0/45 or 0/63.

The first material may be washed together with the second material in the at least one washer. The at least one washer may be a washer of the processing plant. The first material may be washed together with the second material in the at least one washer of the processing plant. The first material and the second material may be mixed before or during the washing. The first material and the second material may be washed in the at least one washer as a mix or as a mutual mass flow. The totality of grain size fractions of the first material and the second material may be washed in the at least washer or just the grain size fraction 0/2 mm 0/3 mm or 0/4 mm may be washed in the at least one washer.

The at least one washer may remove and elutriate components, such as clay and loam, and/or contaminating admixtures, such as wood and metal. Herein, an elutriate material may be defined as a material separatable or removable by washing. These components may be described as elutriable components. Elutriable components may be components that can be elutriated and/or are elutriated. An elutriable component may be a component that is separated and/or removed by washing. Elutriable components may be solids or particles in a mixture that can be removed through the process of elutriation. In this process, the particles and/or components are separated and washed out by rinsing or washing to separate them from the remaining components of the mixture. The first material and the second material may include finely distributed clayey substances and/or fine aggregate powder that may be in the aggregate as nodules or adhere to the grains. These components may also be described as elutriable components. These components may have a damaging effect on the concrete if they are present in large quantities. Therefore, removing the elutriable components is important for the quality of the construction aggregate. This has the advantage, that the elutriable components of the first material and second material may be removed together, resulting in homogenous material with homogenous material properties. These properties are also important for the quality of the construction aggregate. Washing the first material together with the second material in at least one washer may also enhance the quality and usability of the material and may ensure that the material meets the desired quality standards for further processing or final use. Furthermore, no material, except for the elutriable components has to be removed and no additional virgin material has to be supplied. Therefore, resource depletion, habitat disruption and the energy consumption are minimized, making the process environmentally friendly and more sustainable, without sacrificing the quality of the product.

A predefined mass ratio of the mass of the first material and the second material may be established before or during feeding the first material and second material into the processing plant.

The predefined mass ratio of the mass of the first material and the second material may be established before or during feeding the first material and second material into the processing plant. The mass ratio may be established in wt % (weight %) or vol % (volume %). The mass ratio of the first material and/or the second material may be adjusted and/or controlled. The mass ratio may be adjusted by feeding the first material and second material in different ratios and/or feeding speeds. Therefore, the mass ratio may be adjusted dynamically according to a predetermined purpose. The mass ratio may be measured by at least one mass measurement means, which may be a weigher or a weighting machine. Further, the weight may be estimated, by the volume of the first material or the second material e.g., the volume carried by a wheel loader or a pile of material. E.g. if a wheel loader deposits eight shovels of the first material and two shovels of the second material onto a pile, the pile may include 20% of the second material. Predefining the mass ratio has the advantage that the quality of the product may be defined at an early stage and/or that the property and/or composition of the material can be adapted to the intended use and/or purpose.

The mass ratio of the first material and/or the second material may be adjusted such that a mutual mass flow of both materials includes 1-5%, 5-10%, 10-15%, 15-20% or any percentage of 20-99% of the second material. Any percentage of 20-99% may include 20-25%, 25-30%, 30-35%, 35-40%, 40-45%, 45-50%, 50-55%, 55-60%, 60-65%, 65-70%, 70-75%, 75-80%, 80-85%, 85-90%, 90-95%, 95-99%. By adjusting the mutual mass flow, the property of the material and/or the quality may be adjusted according to the intended purpose.

The mass of the material may be defined by the volume and/or the weight of the respective material. Washing the first and second material in a given mass ratio has the advantage, that the elutriable components of both materials are removed. Hence, the elutriable components of the first material and the second material may be removed in the same method step together. Therefore, the first and second material may form a homogeneous material. In an embodiment, only the fraction 0/2 mm, 0/3 mm or 0/4 mm may be washed by the at least one washer. Hence, the sand and/or the sand-fine gravel mix of the second material does not have to be removed and/or landfilled. Furthermore, no virgin material has to be added, since the sand and/or the sand-fine gravel mix of the second material does not have to be removed. This has the advantage, that the elutriable components of fraction 0/2 mm, 0/3 mm or 0/4 mm of the first material and second material may be removed together, resulting in homogenous sand and/or the sand-fine gravel mix. The elutriable components may have a grain size <0.0063 mm. The sand and/or the sand-fine gravel mix may have the properties of virgin sand and/or the sand-fine gravel mix and may not have to be declared as recycled material. The sand and/or the sand-fine gravel mix of the recycled material does not have to be removed and landfilled but may be used as construction aggregate. Hence, no further virgin material has to be added, since the sand and/or the sand-fine gravel mix of the second material does not have to be removed. This minimizes the use of virgin material and therefore the resource depletion, habitat disruption, and energy consumption. Consequently, this process is cost-effective, efficient, energy efficient, environmentally friendly and sustainable, while providing a high-quality product.

The first material and the second material may be sized together by at least one sizer. The first material and the second material may be mixed before or during the sizing. The first material and the second material may be mixed by the at least one sizer. The at least one sizer may be a screening system, which may include a dry screening system or a wet screening system. The first material and the second material may be sized before, during and/or after the washer. In an embodiment, the first material and second material may be sized prior to the washing of the material in the washer. The at least one sizer may have at least two screens. The at least one screen may be a sieve. The material to be sized may be placed on a screen that is rotated or shaken. The sizer may be a mill with a plansifter, a tumbler screening machine or a vibrating screening machine. The first material and the second material may be sized by the at least one sizer as a mutual mass flow. The sizer may include a washer.

Sizing the first material and the second material together has the advantage that the material becomes homogenous and/or easier to process. It also has the further advantage that no separate machines have to be used and therefore the energy consumption can be minimized.

The first material and second material may be sized by the at least one sizer prior to the washing in the washer. A first sizer may remove the oversize grain from the first material and second. Oversize grain is the term used for residue with a grain size that is too large for the screen used in the sizer. The oversize grain may be fed into a crusher for crushing the grain into a defined grain size range. The crusher may be a hammer-type crusher, a cone crusher, a gyratory crusher, a roller crusher, an impact crusher or any other crusher known in the art.

In an embodiment, the first sizer may separate the sand or sand-fine gravel mix (e.g., 0/2 mm, 0/3 mm or 0/4 mm) from the gravel (e.g., 2/32 mm, 3/32 mm or 4/32 mm).

In an embodiment, the mix of first and second material may be sized by a second sizer. In this step, sizers or screening machines produce the concrete-specific grain sizes (e.g., 0/2 mm, 0/3 mm, 0/4 mm, 2/4 mm, 4/8 mm, 8/16 mm and/or 16/32 mm). The products may be dosed by speed-controlled dosing belts in conjunction with belt weighers and an optional computer-assisted dosing software.

The at least one sizer may be a wet screening system or a wet sizer, or a dry screening system or a dry sizer. The first material and the second material may be washed during the sizing by the wet screening system. Hence, the sizer may include a washer. The wet screening system may include a first washer. The terms screening system and sizer may be used interchangeably. The sizer may have at least two decks. Each deck may have a screen for sizing the material. In an embodiment, the sizer may have at least three decks. The sizer may have a first deck with a first screen, a second deck with a second screen and a third deck with a third screen. Additionally, the sizer may have a drain. The first screen may have the biggest mesh size and may remove the largest grain-size fraction. The first screen may have a mesh size of 16-32 mm. The grain-size-fractions smaller than the mesh size of the first screen pass the first screen and may be sized by the second screen. The mesh size of the second screen may be smaller than the mesh size of the first screen but larger than the mesh size of the third screen. The first screen may have a mesh size of 8-16 mm. The grain-size-fractions smaller than the mesh size of the second screen pass the first screen and may be sized by the third screen The third screen may have the smallest mesh size. The first screen may have a mesh size of 2-8 mm, 3/8 mm or 4/8 mm. The grain-size-fractions (i.e., 0-2 mm, 0-3 mm or 0-4 mm) passing the third screen may be removed by the drain. In case of a wet sizer, each deck may include a plurality of nozzles. The nozzles may be arranged above the corresponding screen and above the material to be sized. The nozzles may wet the screen and/or the material. The nozzles may spray the screen and/or the material i.e., with water. By wetting the screens and/or the material the material may be washed, and the quality of the material may be improved and elutriable components may be removed. The smallest grain size, which may be 0-2 mm, 0-3 mm and/or 0-4 mm, may be discharged through the drain with the water. In an embodiment the smallest grain size (e.g., 0-2 mm, 0-3 mm or 0-4 mm) may additionally be washed in a second washer and the elutriable components may be removed. If the sizer is a dry screening system, the sizer may not include a washer and the smallest grain size (e.g., 0-2 mm, 0-3 mm or 0-4 mm) may be washed in the second washer and the elutriable components may be removed. In this embodiment, the second washer may be the first washer.

In an embodiment, the grain size fractions 0/2 mm, 0.3 mm or 0/4 mm may be sized by a third sizer. The third sizer may be an upflow classifier. The third sizer may use a stream of gas or liquid flowing in a direction opposite to the direction of sedimentation. The third sizer may be a hydrocyclone. The hydrocyclone may separate the grain size fractions <0.063 or <0.02 mm from the material.

The first material and the second material may be discharged from the processing plant.

The first material and the second material may then be sorted into different grain size fractions and discharged from the processing plant.

The construction aggregates and/or the grain size fractions of the construction aggregate may be discharged from the processing plant by at least one processing plant discharge. The processing plant may have a plurality of discharges. The number of discharges may correspond to the grain-size fractions sized by the at least one sizer.

The first material and/or the second material may be conveyed on a conveyor. The conveyor may have at least one conveyor section. The at least one conveyor section may include at least one conveying means, having at least one conveying direction, at least one conveying velocity, and which may further include at least one of a mass measurement means, a conveyor feed and a conveyor discharge. The at least one conveying means may feed the first material and/or the second material to the processing plant. The first material and/or the second material may be fed to the at least one conveyor feed of the at least one conveying means.

The at least one conveying direction may be from the at least one conveyor feed to the at least one conveyor discharge. The first material and/or the second material may be conveyed in the at least one conveying direction. The first material and/or the second material may be discharged at the at least one conveyor discharge. The at least one conveying means may be a belt conveyor, such as a modular belt conveyor, a cleated belt conveyor, an Incline/decline belt conveyor, an elevating conveyor belt, a wheel loader, a conveyor pipe, a belt feeder and/or a conveyor line. The at least one feed may be a feed hopper, a feed hopper for recycling material, a chute and/or the at least one conveying means itself. The at least one measurement means may be weigher, such as a metering band weigher, a controlled feed belt weigher, a conveyor scale, a radiometric belt weighing machine, a belt scale and/or a belt weigher.

The conveyor may have a first conveyor section and a second conveyor section. The first conveyor section may include a first conveying means, having a first conveying direction, a first conveying velocity, and which may further include a first mass measurement means, a first conveyor feed and a first conveyor discharge. The first conveying direction may be from the first conveyor feed to the first conveyor discharge.

The second conveying section may include a second conveying means, having a second conveying direction, a second conveying velocity, and which may further include a second mass measurement means, a second conveyor feed and a second conveyor discharge. The second conveying direction may be from the second conveyor feed be to the second conveyor discharge.

The measurement means have the advantage that the mass ratio and/or mass flow can be measured and/or adjusted while the respective material is conveyed. Hence, the quality of the material can be adjusted while the material is conveyed and/or the property and/or composition of the material can be adapted to the intended use and/or purpose.

The first conveying velocity and/or the second conveying velocity may be variable.

The first material may be conveyed along the first conveying direction. The second material may be conveyed along the first conveying direction and/or the second conveying direction.

The first material may be conveyed by a first conveying means and the second material may be conveyed by a second conveying means before feeding then first material and the second material to the processing plant.

The first conveyor feed may be connected to the first conveying means and/or the second conveyor feed may be connected to the second conveying means. The first material may be conveyed by the first conveying means and/or the second material may be conveyed by a second conveying means for feeding the first material and/or the second material to the processing plant. The first material may be fed to the first conveyor feed of the first conveying means (first conveyor feed) and/or the second material may be fed to a second feed of the second conveying means (second conveyor feed). The first mass measurement means may be connected to the first conveying means and the second mass measurement means may be connected to the second conveying means.

The first conveying means and the second conveying means may form an angle $\alpha$. The angle $\alpha$ may be between 0-90°. In an embodiment, the angle $\alpha$ may be 0°-5° or 85°-90°. An angle $\alpha$ of 0°-5° or 85°-90° has the advantage that the material can be fed more precisely without the material unnecessarily missing the respective conveying means. Depending on the mass flow the material missing the respective conveying means can add up to high numbers reducing the effectiveness, posing a problem to the functionality and complicating the adjustment and/or adaptment of the quality and/or property and/or composition of the material.

The mass ratio the first material and the second material may be established by feeding the first material to the first conveying means and the second material to the second conveying means.

The mass flow of the first material may be measured by the first measurement means and/or the mass flow of the second material may be measured by the second measurement means.

The second material may be discharged on the conveying means with the first material. The second material may be discharged onto the first material and/or the first conveying means. The first material and the second material may form a mutual mass flow and/or a mix of the first material and the second material on the first conveying means. The mutual mass flow of the first material and the second material may be formed by discharging the second material onto the first conveying means or discharging the first material onto the second conveying means. The first material and the second material may be conveyed as a mutual mass flow and/or a mix of the first material and the second material on the first conveying means. The second material may be discharged by the second conveyor discharge. The second material may be discharged by the second conveying means at the second conveyor discharge. The second conveyor discharge may be located adjacent or above the first conveying means. This has the advantage that the mixing of the material is already performed at an early stage and a mutual mass flow is established. It is furthermore advantageous that the first material and the second material can be introduced into the processing plant at the same time, which makes the process more efficient.

The mass ratio of the of the first material and the second material may be adjusted by adjusting the conveying velocity of the first conveying means (the first conveying velocity) and/or the second conveying means (the second conveying velocity). The first conveying velocity and/or the second conveying velocity may be adjusted manually and/or by a controller. The first conveying velocity and/or the second conveying velocity may be adjusted and/or controlled depending on the mass flow of the first material and/or second material measured by the first measurement means and/or second measurement means. The first conveying velocity and the second conveying velocity may be variably independently. The mass ratio of the first material and/or the second material may be adjusted such that a mutual mass flow of both materials includes 1-5%, 5-10%, 10-15%, 15-20% or any percentage of 20-99% of the second material. The mass flow of the first material may stay unchanged while the mass flow of the second material may be adjusted. The mass flow of the second material may stay unchanged while the mass flow of the first material may be adjusted. In an embodiment, the mass flow of the second material may be adjusted while the mass flow of the first material may be a continuous mass flow. By adjusting the respective conveying velocity, the quality and/or property and/or composition of the product can be adjusted and/or controlled more convenient. This may increase the quality of the final product.

If the percentage of the second material is too low in the mutual mass flow and/or the mixed first material and second material (e.g., <20%, <15% or <10%), the conveying velocity of the second conveying means (second conveying velocity) may be increased and/or the conveying velocity of the first conveying means (first conveying velocity) may be decreased. If the mutual mass flow and/or the mix of the first material and second material contains a too high percentage (e.g., >20%, >15% or >10%) of the second material the conveying velocity of the second conveying means (second conveying velocity) may decreased and/or the conveying velocity of the first conveying means (first conveying velocity) may be increased. Alternatively, or additionally, the conveying velocity of the first conveying means may be increased or decreased accordingly.

The first material and the second material may be discharged into the processing plant by the first conveyor discharge. The first conveyor discharge may discharge and/or feed the mutual mass flow of the first and second material and/or the mix of the first material and the second material into the processing plant. The mutual mass flow of the first and second material and/or the mix of the first material and the second material may be fed to processing plant. The mutual mass flow of the first and second material and/or the mix of the first material and the second material may be fed to processing plant together. This has the advantage, that the material is already mixed which leads to an improved intermixing when introduced into the processing plant. It is furthermore advantageous, because the materials are introduced into the processing plant at the same time, which makes the process more efficient and energy efficient.

A device for producing construction aggregate may include the conveyor with the first conveyor section with the first material and/or a second conveyor section with the second material. The first material may be the virgin material. The second material may be the recycled material.

The device for producing construction aggregate may further include the processing plant for the virgin material and the recycled material with the processing plant feed and the washer. The first conveying means may be connected to a virgin material source and the second conveying means may be connected to a recycled material source. The virgin material source and/or the recycled material source may be a pile of virgin material or recycled material, a bunker, a silo or a hopper.

The Device for producing a construction aggregate may include the conveyor with at least two conveyor sections. The first conveyor section may include the first conveying means, having the first conveying direction, the first conveying velocity, and which may further include the first mass measurement means and/or the first feed and/or the first conveyor discharge. The second conveyor section may include the second conveying means, having the second conveying direction, the second conveying velocity, and which may further include the second mass measurement means and/or the second feed and/or the second conveyor discharge. The first feed may be connected to the first conveying means and/or the second feed may be connected to the second conveying means. The first mass measurement means may be connected to the first conveying means and/or the second mass measurement means may be connected to the second conveying means. The second conveyor discharge may be located adjacent or above the first conveying means. The first conveying means and the second conveying means may form the angle $\alpha$ (0-90°). The angle $\alpha$ may be between 0-90°. In an embodiment, the angle $\alpha$ may be 0°-5° or 85°-90°.

The first conveying velocity and the second conveying velocity may be variably independently.

The processing plant may include at least one processing plant feed and/or the least one crusher and/or the at least one washer and/or the at least one sizer and/or the at least one processing plant discharge, wherein the processing plant may be located downstream of the first conveyor discharge and second conveyor discharge.

BRIEF DESCRIPTION OF DRAWINGS

In the following the invention will be described by way of example, without limitation of the general inventive concept, on examples of embodiment with reference to the drawings.

FIG. 1 shows a schematic view of a device for producing a construction aggregate.

DETAILED DESCRIPTION

In FIG. 1 a first embodiment is shown. FIG. 1 shows a schematic view of a device for producing a construction aggregate. The device 100 may include a conveyor 200, 300 and a processing plant 500. The conveyor 200, 300 may include a first conveyor section 200 and a second conveyor section 300. The first conveyor section 200 may include a first conveying means 210, having a first conveying direction 230, a first conveying velocity, and which may further include a first measuring means 220, a first conveyor feed 240, and a first conveyor discharge 250. The second conveyor section 300 may include a second conveying means 310, having a second conveying direction 330, a second conveying velocity, and which may further include a second measuring means 320, a second conveyor feed 340 and a second conveyor discharge 350. The first conveying means 210 and the second conveying means 310 may form an angle α 400. The angle α 400 may be between 0° and 90° in an embodiment, the angle α 400 may be 0° to 5° or 85° to 90°. The first conveying direction 230 may extend from the first conveyor feed 240 to the first conveyor discharge 250. The second conveying direction 330 may extend from the second conveyor feed 340 to the second conveyor discharge 350. The first measurement means 220 may be connected to the first conveying means 210 and the second measurement means 320 may be connected to the second conveying means 310. The first measurement means 220 may measure the mass flow of the first material and the second measurement means 320 may measure the mass flow of the second material. A first material may be fed to the first conveyor feed 240 and a second material may be fed to the second conveyor feed 340. The first material may be a virgin material and the second material may be a recycled material. The first material may be conveyed in a conveying direction 230 from the first conveyor feed 240 to the first conveyor discharge 250 by the first conveying means 210. The second material may be conveyed from in a second conveying direction 330 from the second conveyor feed 340 to the second conveyor discharge 350 by the second conveying means 310. The second material may be conveyed from the second conveyor feed 340 to the second conveyor discharge 350 in the first conveying direction 330 by the second conveying means 310 and from the second conveyor discharge 350 to the first conveyor discharge 250 by the first conveying means 210 in the first conveying direction 230. The second material may be discharged onto the first conveying means 210 and/or onto the first material. The first material and second material may form a mutual mass flow and/or a mix of the first material and the second material. A predefined mass ratio of the mass of the first material and the second material may be established before or during feeding the first material and second material into the processing plant. The mass ratio may be adjusted and/or controlled. The mass ratio may be adjusted and/or controlled depending on the measurements of the mass measuring means 220, 320. If the percentage of the second material is too low in the mutual mass flow and/or the mix of the first material and the second material (e.g., <20%, <15% or <10%), the conveying velocity of the second conveying means 310 (second conveying velocity) may be increased and/or the conveying velocity of the first conveying means 210 (first conveying velocity) may be decreased. If the, mutual mass flow and/or the mix of the first material and the second material contains a too high percentage of the second material (e.g., >20%, >15% or >10%), the conveying velocity of the second conveying means 310 (second conveying velocity) may be decreased and/or the conveying velocity of the first conveying means 210 (first conveying velocity) may be increased. In an embodiment, the conveying velocity of the first conveying means 210 may be increased or decreased accordingly.

The first material and the second material may be discharged into the processing plant by the first conveyor discharge 250. The first conveyor discharge 250 may discharge and/or feed the mutual mass flow of the first and second material and/or the mix of the first material and the second material into the processing plant 500. The mutual mass flow of the first and second material and/or the mix of the first material and the second material may be fed to processing plant 500. The processing plant 500 may include at least one washer 520. The processing plant 500 may further include at least one sizer 510 and optionally at least one crusher 512. The first material and second material may be fed to the processing plant 500 by the conveyor 200, 300. The processing plant 500 may be a gravel, a crushed stone and/or sand processing plant. The first material and the second material may be fed to the processing plant as a mutual mass flow and/or the mix of the first material and the second material. The first material and the second material may be fed to the processing plant 500 by the conveyor 200, 300. The first material and the second material may be fed to a processing plant feed of the processing plant 500. The processing plant feed may be a feed hopper, a chute or the processing plant itself.

The first material may be washed together with the second material in the at least one washer 520 of the processing plant 500. The first material and the second material may be washed in the at least one washer 520 as a mutual mass flow and/or the mix of the first material and the second material. The at least one washer 520 may remove elutriable components. Removing the elutriable components is important for the quality of the construction aggregate.

The totality of grain size fractions of the first material and the second material may be washed in the at least washer 520 as a or just the grain size fraction 0/2 mm, 0/3 mm or 0/4 mm may be washed in the at least one washer 520. A predefined mass ratio of the mass of the first material and the second material may be established by feeding the first material and second material to the processing plant 500. The mass ratio of the first material and/or the second material may be adjusted and/or controlled. The mass ratio of the first material and/or the second material may be adjusted and/or by feeding the first material and second material in different ratios. The mass ratio of the first material and/or the second material may be adjusted such that a mutual mass flow of both materials includes 1-5%, 5-10%, 10-15%, 15-20% or any percentage of 20-99% of the second material.

The first material and the second material may be sized together by at least one sizer 510, 530. The first material and the second material may be mixed before or during the sizing. The first material and the second material may be mixed by the at least one sizer 510, 530. The at least one sizer 510, 530 may be a screening system. The at least one sizer may be a dry screening system or a wet screening system. The first material and the second material may be sized before, during and/or after the washer 520. In an embodiment, the wet screening system may include a washer. The first material and the second material may be washed during the sizing by the wet screening system. Hence, the at least one sizer 510, 530 may include a washer. The wet screening system may include a first washer. In an embodiment, the first material and second material may be sized prior to the washer. The at least one sizer 510, 530 may have at least two screens. The material to be sized may be placed on a screen that is rotated or shaken. The sizer may be a mill with a plansifter, a tumbler screening machine or a vibrating screening machine. The first material and the second material may be sized by the at least one sizer 510, 530 as a mutual mass flow.

The first material and second material may be sized by the at least one sizer 510, 530 prior to the washing in the washer 520. A first sizer 510 may remove the oversize grain from the first material and second. The oversize grain may be fed into a crusher 512 for crushing the grain into a defined grain size range. The first sizer may alternatively or additionally separate the sand and or sand-fine gravel mix (0/2 mm, 0/3 mm or 0/4 mm) from the gravel (2/32 mm, 3/32 mm or 4/32 mm).

In an embodiment the smallest grain size (e.g., 0-2 mm, 0-3 mm or 0-4 mm) may be washed in a second washer and the elutriable components may be removed. If the sizer is a dry screening system, the sizer may not include a washer and the smallest grain size (e.g., 0-2 mm, 0-3 mm or 0-4 mm) may be washed in the second washer and the elutriable components may be removed. In this embodiment, the second washer may be the first washer. In an embodiment, the first and second material may be sized by a second sizer 530. In this step, sizers or screening machines produce the concrete-specific grain sizes (e.g., 0/2 mm, 0/3 mm, 0/4 mm, 2/4 mm, 4/8 mm, 8/16 mm and/or 16/32 mm). The grain size fraction 0/2 mm, 0/3 mm or 0/4 mm may not contain any fractions <0.0063 mm. The products may be dosed by a speed-controlled dosing belts in conjunction with belt weighers and a computer-assisted dosing program.

In an embodiment, the grain size fractions 0/2 mm, 0/3 mm or 0.4 mm may be sized by a third sizer. The third sizer may use a stream of gas or liquid flowing in a direction opposite to the direction of sedimentation. The third sizer may be a hydrocyclone. The hydrocyclone may separate the grain size fractions <0,063 or <0.02 mm from the material.

The at least one sizer 510, 530 may be a wet screening system or a wet sizer, or a dry screening system or a dry sizer.

The first material and the second material may be discharged from the processing plant 500.

The construction aggregates and/or the grain fractions 610, 620, 630 of the construction aggregate may be discharged from the processing plant by at least one processing plant discharge. The processing plant may have a plurality of discharges. The number of discharges may correspond to the grain-size fractions sized by the at least one sizer 510, 530.

LIST OF REFERENCE NUMERALS

100 Device for producing a construction aggregate
200 first conveyor section
210 first conveying means
220 first mass measurement means
230 first conveying direction
240 first conveyor feed
250 first conveyor discharge
300 second conveyor section
310 second conveying means
320 second mass measurement means
330 second conveying direction
340 second conveyor feed
350 second conveyor discharge
400 angle α
500 processing plant
510 first sizer
512 crusher
520 washer
530 second sizer

The invention claimed is:

1. A method for producing a construction aggregate, the method comprising:

mixing a first material and a second material, wherein the first material is a natural raw material, the second material is a recycled material, and the second material includes grain sizes of less than 4 mm; and washing the first material together with the second material in at least one washer.

2. The method of claim 1, further comprising feeding the first material and the second material to a processing plant, wherein the at least one washer is in the processing plant.

3. The method of claim 2, further comprising establishing a mass ratio of the mass of the first material to the mass of the second material before or during feeding the first material and the second material to the processing plant.

4. The method of claim 3, further comprising conveying the first material using a first conveyor and conveying the second material using a second conveyor before feeding the first material and the second material to the processing plant.

5. The method of claim 4, further comprising feeding the first material to a first feed of the first conveyor and/or feeding the second material to a second feed of the second conveyor.

6. The method of claim 4, wherein adjusting the mass ratio of the first material and the second material includes adjusting a first conveying velocity of the first conveyor and/or a second conveying velocity of the second conveyor.

7. The method of claim 4, further comprising forming a mutual mass flow of the first material and the second material by discharging the second material onto the first conveyor or discharging the first material onto the second conveyor.

8. The method of claim 1, wherein:

the first material includes at least one of fragments of rock or fragments of stone, and the second material comprises at least one of fragments of artificial stone or concrete.

9. The method of claim 1, wherein the first material and the second material are mixed before or during the washing of the first material together with the second material.

10. The method of claim 1, further comprising sizing the first material and the second material together using at least one sizer during or after the mixing of the first material and the second material.

11. The method of claim 1, further comprising measuring a first mass flow of the first material using a first sensor and/or measuring a second mass flow of the second material using a second sensor.

* * * * *